Figure 1:
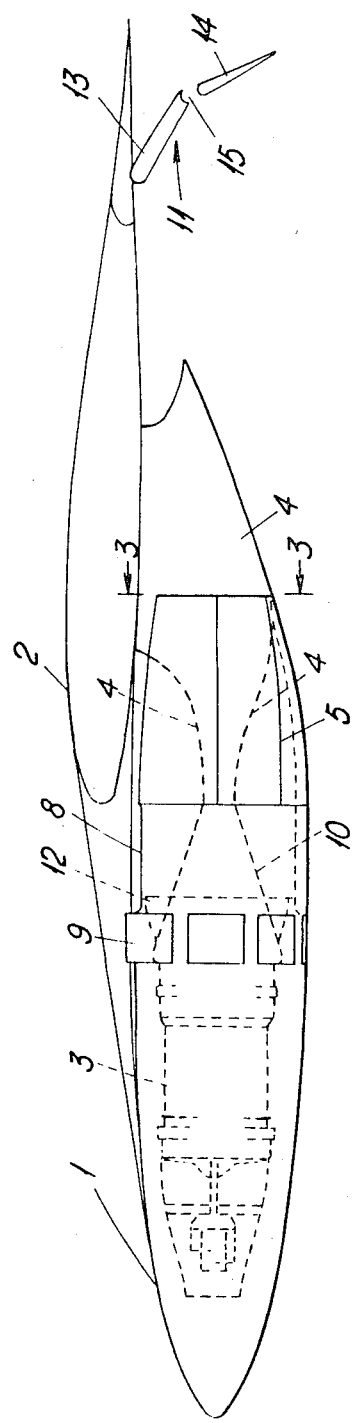

United States Patent [19]
Morgan

[11] 3,746,283
[45] July 17, 1973

[54] AIRCRAFT

[75] Inventor: Alfred Arthur Morgan, St. Albans, Hertfordshire, England

[73] Assignee: Hawker Siddeley Aviation Limited, Surrey, England

[22] Filed: Aug. 18, 1971

[21] Appl. No.: 172,844

[30] Foreign Application Priority Data
Aug. 18, 1970 Great Britain.................. 39,794/70

[52] U.S. Cl. ....................... 244/42 CB, 244/42 CC
[51] Int. Cl. ............................................. B64c 3/50
[58] Field of Search .................. 244/42 CC, 42 CD, 244/42 CB, 42 DA, 42 R, 1 N

[56] References Cited
UNITED STATES PATENTS
| | | | |
|---|---|---|---|
| 2,891,740 | 6/1959 | Campbell | 244/42 CC X |
| 3,276,724 | 10/1966 | Saunders | 244/42 D X |
| 3,614,028 | 10/1971 | Kleckner | 244/42 DA X |

OTHER PUBLICATIONS

NASA Tech. Brief – Reduction of Fan Noise, B72-100-40-1972, Technology Utilization Office, NASA, Washington, D.C., 20546

*Primary Examiner*—Milton Buchler
*Assistant Examiner*—Carl A. Rutledge
*Attorney*—Rose & Edell

[57] ABSTRACT

A blown flap on an aircraft receives its forced air/gas flow as unducted efflux from a power plant/ejector system mounted under the wing. The system comprises a number of gas turbine engines, which may be short-term rated engines, each disposed with its axis fore-and-aft housed in a streamlined pod having side doors for primary and secondary intake air and for discharging the efflux spanwise. A bullet or spreader body promotes departure of the efflux through the discharge doors and also provides a streamline tail for the pod.

7 Claims, 3 Drawing Figures

PATENTED JUL 17 1973

3,746,283

SHEET 1 OF 2

Inventor
ALFRED ARTHUR MORGAN

By Rose & Edell

Attorneys

Inventor
ALFRED ARTHUR MORGAN

By Rose & Edell
Attorneys

AIRCRAFT

This invention relates to aircraft, and more particularly aircraft with blown flaps to give them a short take-off and landing capability.

High lift flaps are well known, and the blown flap is one in which the natural air flow over the flap is augmented by forced air or gas flow ducted to appropriate outlets on the wing from a source of air or gas under pressure such as a gas turbine engine. Since the ducting and outlets for the forced air flow need to be designed to give a reasonably continuous spanwise spread, i.e., a sheet of air along the wing, these arrangements can be quite complicated. It is an object of the invention to provide an improved blown flap system.

According to the present invention, a blown flap assembly on an aircraft wing receives its forced air/gas flow as the unducted efflux from one or more wing-mounted gas turbine engines.

In the preferred form each such engine is mounted with its axis fore-and-aft in a streamline fairing or pod close under the wing, which pod may project a substantial distance forward of the wing. The desired spanwise spread of the engine efflux can be achieved by directing it through side doors in the pod, with a special bullet or spreader body disposed at the aft end of the pod substantially in line with the engine to promote departure of the efflux through these doors in a suitable aerodynamic fashion. This bullet advantageously has a rear portion constituting a streamline tail for the pod.

The engine can be any gas turbine unit of appropriate capacity but it is preferred to use a so-called lift engine (mounted with its axis fore and aft instead of vertical) rather than a continuously rated propulsion-type engine. The lift engine, not being continuously rated, is of smaller size, cost and weight for the same capacity than a propulsion engine; and the engines for this blown flap system are only required to run at take-off and landing, i.e., for the same periods as a lift engine used in the conventional way to give direct upward thrust.

Figure 3:
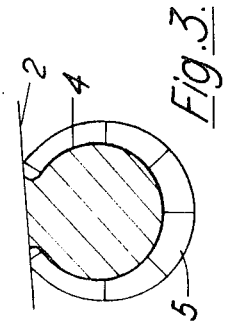
Figure 2:
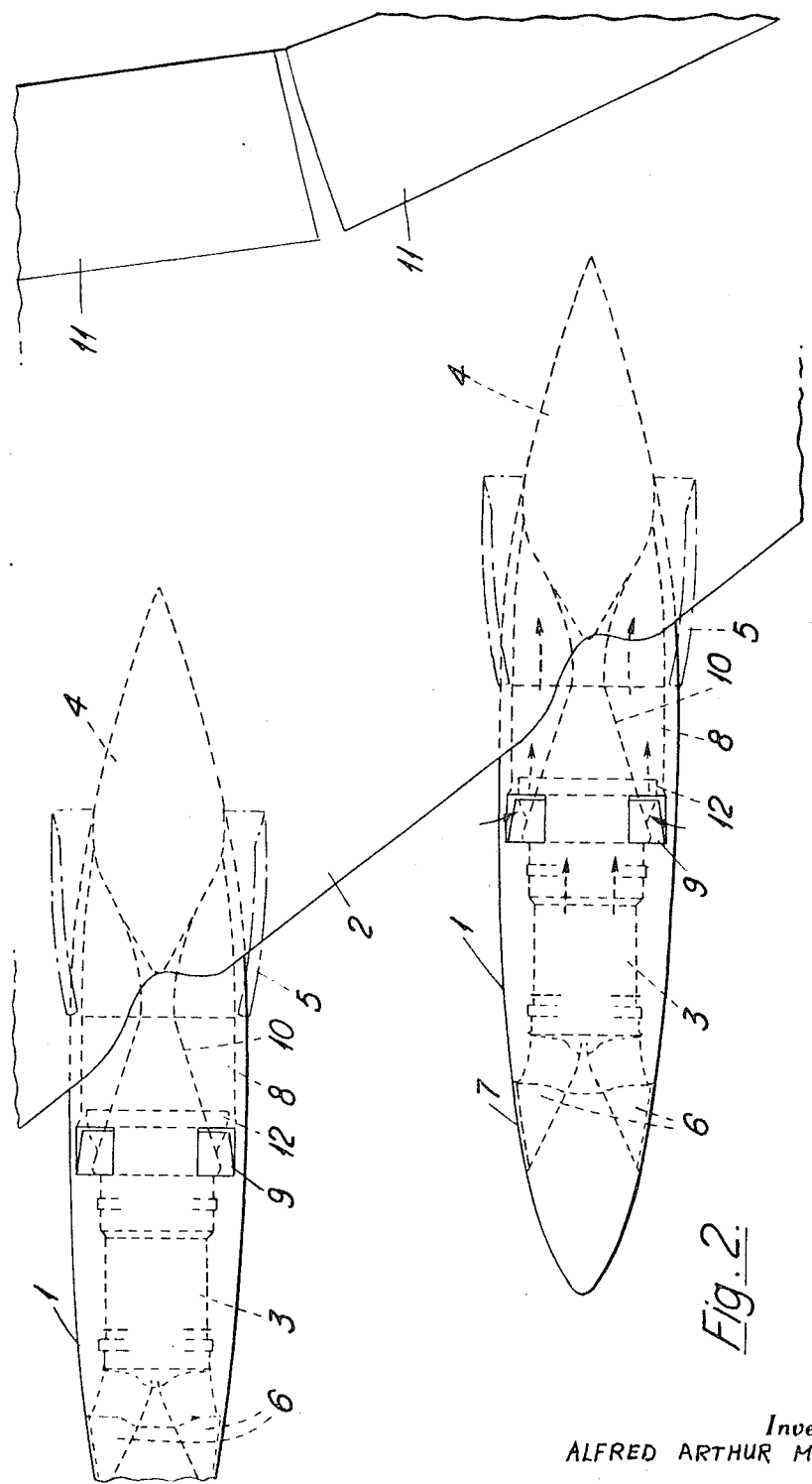

One particular arrangement in accordance with the invention will now be described, by way of example, with reference to the accompanying drawings, in which:

FIG. 1 shows the engine and flap system to be described in diagrammatic side elevation, FIG. 2 is a plan, and FIG. 3 is a view in section on the line 3—3 of FIG. 1.

In the drawings, an aircraft wing 2 is shown, beneath which are mounted gas turbine engines 3 each enclosed with a minimum-profile streamline fairing or pod 1 which fits closely to the underside of the wing. The normal large base drag associated with wing-mounted engines is reduced by the provision of a specially-shaped exit body or bullet 4, being a partly internal structure of the aft end of the pod 1. The fairing or pod also has aft of the engine a set of outwardly opening petal-type outlet doors 5 which are partly manufactured from sound-proofing material.

Air intakes 6 located in the sides of the fairing near the nose admit primary air to the engine. These intakes in normal cruise flight are closed off by flush intake doors 7 which hinge inwards when the engine is functioning. The engine efflux enters an ejector box 8 through multi-lobed nozzles 12 and in so doing draws in secondary air through inwardly-opening intake doors 9 provided in the fairing 1 around the aft end of the engine. A conical plug 10 within the ring of nozzle lobes 12 and the ejector box 8, provides continuity between the engine 3 and the special bullet 4.

It will be seen that the bullet 4 has a rear portion providing the tapering end of the fairing or pod 1 aft of the outlet doors 5, and a forward portion within the ring of outlet doors which increases in diameter rearwardly from a waisted region where its forward end unites with the plug 10. Therefore, not only does the rear portion give a drag-reducing external aerodynamic shape to the aft end of the pod but also the internal forward portion acts as an aerodynamic spreader for the efflux gases discharging through the outlet doors 5. The gas generator flow from the engine mixes with the secondary air flow in the ejector box 8 and passes out through the doors 5 around the bullet 4, being ejected as a high velocity flow with a considerable horizontal spread.

The wing 2 is equipped at its trailing edge with a high lift flap assembly 11. This comprises a main flap 13 and a tab 14 on the main flap which is deflectable downward relative thereto, with a slot 15 then opening up between the nose of the tab and the main body of the flap. By reason of the high velocity engine efflux issuing rearwardly under the wing with a wide horizontal spread the high lift flap assembly functions as a blown flap, even although there are no actual ducts in the wing for leading gas under pressure to it.

In the arrangement illustrated, four of the engines 3 are fitted, two under each wing, to give a reasonably continuous span-wise spread of the efflux over the whole flap system. It will be understood that these engines are only used during take-off and landing to augment lift in conjunction with the flap system, and are shut down during normal cruise flight. The aircraft has separate propulsion engines, not shown, which may for instance be mounted at the tail region of the fuselage.

An advantageous aspect of the arrangement is that jet noise from the engines is minimised. Sound absorbing materials are employed in the construction of both the intake and the outlet doors; also, the special bullet and an annulus of the pod fairing at the gas exit are lined with sound absorbing material.

The whole engine assembly presents a self-contained power plant/ejector system for an aircraft with externally blown flaps, in which internal passage shapes integral with the power plant/ejector system are utilised to spread the efflux spanwise to cover a larger area of wing flap than is possible with a normal jet efflux. Due to the streamlined shape of the fairing aerodynamic drag is kept to a minimum.

Another particular advantage of the arrangement described is that it can be fitted as a modification to an existing conventional aircraft to give it STOL capability.

Although in the embodiment described and illustrated lift engines with short term ratings are employed, it is within the scope of the invention to employ other types of engines, and in particular engines arranged to be run continuously, perhaps at reduced power, to augment the normal propulsive thrust.

What I claim is:

1. An aircraft wing with a blown flap, comprising a flap assembly at the trailing edge of the wing which flap assembly is deflectable downwardly into a high lift condition, at least one gas turbine engine mounted under the wing with its axis foreand-aft, the engine being close enough to the underside of the wing for the rearward extension of its axis to intersect said flap assembly when said flap assembly is deflected downward into the high lift condition, a pod housing the engine to provide a streamline fairing therefor, side openings in the pod through which the engine efflux is directed so as to produce a fan-wise spreading of the engine efflux along the span of the wing flap assembly, side doors on the pod for opening and closing said side openings, and a bullet-like spreader body disposed at the aft end of the pod substantially in line with the engine axis to promote departure of the efflux through said side openings in a drag-minimizing manner, said spreader having a rear portion constituting a streamline tail for the pod.

2. An assembly according to claim 1, wherein the side doors contain sound-proofing material.

3. An assembly according to claim 1, wherein said wing mounted engine is of the type known as a lift engine (but mounted with its axis substantially horizontal instead of vertical) and not a continuously rated engine.

4. An assembly according to claim 1, wherein the pod has side intake doors forward of the engine for the admission of primary air which intake doors contain sound-proofing material.

5. An assembly according to claim 1, wherein the spreader body and an annulus of the pod fairing at the gas exit are lined with sound-absorbing material.

6. An assembly according to claim 1, wherein the engine has a multi-lobed nozzle delivering the engine gases into an ejector box where the gases mix with secondary air admitted through intake doors in the sides of the pod.

7. An assembly according to claim 3, wherein a conically tapering body within the ejector box unites at its rear end with the forward end of the spreader body.

* * * * *